Sept. 27, 1960  C. E. MOELLER  2,954,070
CHILD'S SEAT FOR AUTOMOBILES
Filed Nov. 6, 1957
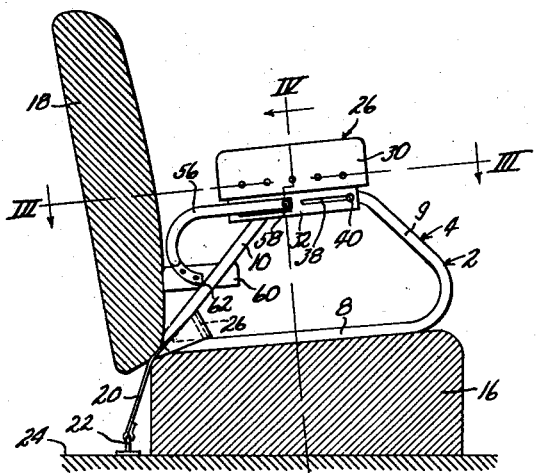
INVENTOR.
Calvin E. Moeller
BY John A. Hamilton
Attorney.

United States Patent Office 2,954,070
Patented Sept. 27, 1960

2,954,070
CHILD'S SEAT FOR AUTOMOBILES
Calvin E. Moeller, Lake Forest, Bonner Springs, Kans.
Filed Nov. 6, 1957, Ser. No. 694,850
6 Claims. (Cl. 155—11)

This invention relates to new and useful improvements in children's seats, and has particular reference to a seat to be used in an automobile.

An important object of the present invention is the provision of a child's seat for automobiles having novel safety features whereby the seat itself is retained securely in position and the child restrained closely in the seat, whereby to prevent dislodgement of the seat or displacement of the child from the seat in the event of sudden application of the automobile brakes, or in the event of a collision.

Another important object is the provision of a seat of the character described which may be attached to the passenger's portion of the front seat of a two-door automobile. It will be understood that the back cushion of this seat, in automobiles of this body style, must be tilted forwardly to permit passengers to enter the rear seat compartment of the automobile. According to my present invention, the child's seat will not prevent or interfere with the movement of the seat back.

Other objects are simplicity and economy of construction, efficiency and dependability of operation, and adaptability to be adjusted for use by children of different ages and sizes.

With these objects in view, as well as other objects which will appear in the course of the specification, reference will be had to the drawing, wherein:

Fig. 1 is a side elevational view of a child's seat embodying the present invention, shown in position for use mounted on an automobile seat, Fig. 2 is a view similar to Fig. 1, showing the parts positioned to permit forward tilting of the automobile back cushion, Fig. 3 is an enlarged sectional view of the child's seat only, taken on line III—III of Fig. 1, Fig. 4 is an enlarged sectional view of the child's seat only, taken on line IV—IV of Fig. 1, and Fig. 5 is an enlarged fragmentary sectional view taken on line V—V of Fig. 4.

Like reference numerals apply to similar parts throughout the several views, and the numeral 2 applies generally to a chair or seat body member including a pair of generally planar side frames 4. Each of said side frames comprises a closed trapezoidal loop formed of tubular stock and having a generally horizontal top portion 6 and base portion 8, a downwardly and forwardly inclined front leg 9, and a downwardly and rearwardly inclined rear leg 10. The base portions of said side frames are rigidly joined at their rearward ends by a cross bar 12, and adjacent their forward ends by a cross bar 14. This body member is adapted to be placed on the front seat cushion 16 of an automobile, as shown in Figs. 1 and 2, the rearward end of said body member engaging the back cushion 18 of the car seat, and is adapted to be secured in said automobile seat by passing a safety belt 20 through the lower rearward corners of side frames 4, as shown. Said safety belt is of the ordinary type commonly supplied for automobiles, being secured to cleats 22 fastened to the car floor 24, passing upwardly between seat and back cushions 16 and 18, and intended usually to be buckled around the body of a passenger occupying the seat, to prevent him from being thrown forwardly from the seat in the event of a collision or sudden stopping. In the present instance, said safety belt secures the child's seat in the car seat. Each side frame 4 is provided with a rigidly fixed bar 26 traversing its lower rear corner, as shown, to provide convenient members about which to pass the safety belt. It will be noted that side frames 4 diverge outwardly and downwardly of the seat, whereby base portions 8 thereof are spaced widely apart to provide greater lateral stability for the seat, as will be described. It will be noted also that back cushion 18 is pivotal forwardly from the position shown in Fig. 1 to the position shown in Fig. 2. This type of construction is standard in the passengers' portion of the front seat of two-door automobiles, in order to provide access to the rear seat of the automobile.

A tray 26 is carried at the upper portion of body member 2. Said tray is formed of thin, resilient material such as thin, springy metal or a tough, yieldable plastic, having a depressed well 28 formed in its upper surface for carrying an infant's toys, or for containing any food which might be spilled by the infant, and being provided around its entire periphery with a broad, depending apron 30. Along the opposite sides of said tray, a pair of parallel, vertical plates 32 are respectively secured to the inner surfaces of apron 30, as by rivets 34. Said plates extend below the tray apron, and are disposed respectively at the distal sides of top portions 6 of side frames 4. Said tray is supported adjacent its forward end by a rod 36 which extends horizontally between frame portions 6 and through holes provided in said frame members, the opposite end portions of said rod passing respectively through horizontal slots 38 formed in plates 32. A nut 40 is threaded on each end of the rod. A spacer sleeve 42 on the rod between frame members 6 holds said frame members in position, and spacers 44 on said rod at each side of each of plates 32 serves to keep said plates properly spaced from the frame. Tray 26 is supported at its rearward end by a rod 46 parallel to and similar in function to rod 36, being supported in frame members 6 and extending through slots 48 formed in the rearward portions of plates 32. Rod 46 is also provided with spacer sleeves 50 and 52 similar to sleeves 42 and 44 of rod 36. Slots 48 are formed as shown in Fig. 5, having a series of spaced apart notches 54 formed in the upper edge thereof, each capable of receiving rod 46 therein, said notches being upwardly and rearwardly inclined.

Rod 46 is extended outwardly at each end, and pivoted on the ends thereof respectively are a pair of tubular arm members 56. Said arm members are retained on the rod by nuts 58 threaded on the ends of the rod, and normally extend rearwardly as shown in Fig. 1. At their rearward ends, they are curved downwardly and forwardly, and are rigidly fixed at their ends to the opposite sides of a generally planar seat 60 which is also normally horizontal, being disposed in height below tray 26 but above base members 8. The seat is supported in this position by the engagement of the extreme ends of arm members 56 with rear frame legs 10, at the point 62. In this position the forward portion of the seat extends between rear frame legs 10, and the rear edge of the seat substantially engages the back cushion 18 of the car seat.

The use and operation of the child's seat is believed to be reasonably apparent. Tray 26 is pushed forwardly to the limit of its travel after first lifting the rearward edge thereof to disengage rod 46 from notches 54 of slot 48. With the tray forward, a maximum clearance is provided between the tray and seat 60, so that a child may be placed on the seat with the greatest ease and convenience. After the child is positioned, the tray is moved rearwardly preferably until the apron 30 thereof engages the child's chest or body, and the rearward edge of the tray is lowered until one of the notches 54 of each slot 48 engages rod 46. Which notch this will be depends of course on the size of the child and the thickness of clothing the child is wearing. The forward cross bar 14 serves as a foot rest.

The child is thus held securely and snugly in place. Due to the inclination of slot notches 54, no forward pressure on the tray by the child's body can cause forward movement of the tray, and the child is thus protected against being thrown forwardly in the event the car stops suddenly. Obviously the notches 54, slots 48 and rod 46 constitute a latch which requires rearward movement of the tray before it can be released. Injury to the child from the tray itself is prevented by the fact that the tray apron 30 has a very broad area of contact with the child's body, and also by the resiliently yieldable nature of the material from which the tray is formed.

When it is desired to pivot the back cushion 18 of the car seat forwardly, tray 26 is moved to its forward-most position and arm members 56 are pivoted upwardly and forwardly, both as shown in Fig. 2. This moves both the tray and the seat 60 sufficiently forwardly with respect to the inclined plane of rear frame legs 10 that they will not interfere with the necessary movement of back cushion 18.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. For use in conjunction with an automobile seat assembly comprising a seat cushion and a back cushion operable to be tilted forwardly over said seat cushion, a child's seat assembly comprising a body member having a base portion adapted to be supported on said automobile seat cushion with its rearward edge engaging said back cushion and having rear legs rigidly connected to said base portion and inclined upwardly and forwardly from the rearward edge of said base portion, a seat member, and means adjustably mounting said seat member on said body member with its rearward edge normally disposed substantially above the rearward edge of said base portion, whereby the automobile back cushion is utilized also as a back cushion for said child's seat, said seat member being movable relative to said body member to a position substantially forward of the inclined plane of the rear legs of said body member, whereby to permit forward pivoting of said automobile back cushion.

2. The structure as recited in claim 1 wherein said seat is fixed to elongated arms pivoted to said body member forwardly of the plane of said rear legs, said arms rising above said seat member at the sides thereof to prevent lateral dislodgement of a child from said seat member.

3. The structure as recited in claim 1 with the addition of a tray member, and adjustable means whereby said tray member is mounted on said body member above and forwardly from the normal position of said seat member, said tray being forwardly and rearwardly movable with respect to said body member, and extending substantially rearwardly of the plane of said rear legs when in its rearmost position.

4. The structure as recited in claim 1 with the addition of a tray member, and adjustable means whereby said tray member is mounted on said body member above and forwardly from the normal position of said seat member, said tray being forwardly and rearwardly movable with respect to said body member, and extending substantially rearwardly from the plane of said rear legs when in its rearmost position, and latch means operable to secure said tray member selectively at any of a series of positions in its travel.

5. The structure as recited in claim 1 with the addition of a tray member, and adjustable means whereby said tray member is mounted on said body member above and forwardly from the normal position of said seat member, said tray being forwardly and rearwardly movable with respect to said body member, and extending substantially rearwardly of the plane of said rear legs when in its rearmost position, and latch means operable to secure said tray member selectively at any of a series of positions in its travel, the release of said latch means requiring a slight rearward movement of said tray.

6. The structure as recited in claim 1 with the addition of a tray member, and adjustable means whereby said tray member is mounted on said body member above and forwardly from the normal position of said seat member, said tray being forwardly and rearwardly movable with respect to said body member, and extending substantially rearwardly of the plane of said rear legs when in its rearmost position, and latch means operable to secure said tray member selectively at any of a series of positions in its travel, said tray being resiliently yieldable, and having a broad vertical area at its rearward edge adapted to engage the body of a child occupying said seat member.

References Cited in the file of this patent

UNITED STATES PATENTS

| | | |
|---|---|---|
| 1,056,284 | Lidner | Mar. 18, 1913 |
| 2,308,315 | Smith | Jan. 12, 1943 |
| 2,317,894 | Doty | Apr. 27, 1943 |
| 2,679,282 | Anderegg | May 25, 1954 |